No. 849,962. PATENTED APR. 9, 1907.
H. E. BELL.
HAY CURING RACK.
APPLICATION FILED AUG. 14, 1906.

Witnesses
Inventor
Henry E. Bell,
By James L. Norris.
Atty.

UNITED STATES PATENT OFFICE.

HENRY E. BELL, OF BURKEVILLE, VIRGINIA.

HAY-CURING RACK.

No. 849,962.    Specification of Letters Patent.    Patented April 9, 1907.

Application filed August 14, 1906. Serial No. 330,617.

*To all whom it may concern:*

Be it known that I, HENRY E. BELL, a citizen of the United States, residing at Burkeville, in the county of Nottoway and State of Virginia, have invented new and useful Improvements in Hay-Curing Racks, of which the following is a specification.

This invention relates to a hay-curing frame or rack adapted to be used in fields to receive hay as cut; and the primary object of the same is to provide a simple folding framework composed of readily-movable members which when arranged to receive the hay provide for a thorough ventilation of the latter and a thorough circulation of air therein and around the same, which is particularly advantageous in curing hay during wet weather.

A further object of the invention is to provide a rack which will sustain the hay elevated above the ground and in open condition interiorly, the rack being portable and of a comparatively light structure and having means at the upper extremity thereof for holding a stack of hay in place to produce a top covering and prevent the passage of water downwardly into the interior of the quantity of hay arranged on and about the rack.

With these and other objects and advantages in view the invention consists in the novel construction and arrangement of the several parts which will be more fully hereinafter set forth.

Figure 1:
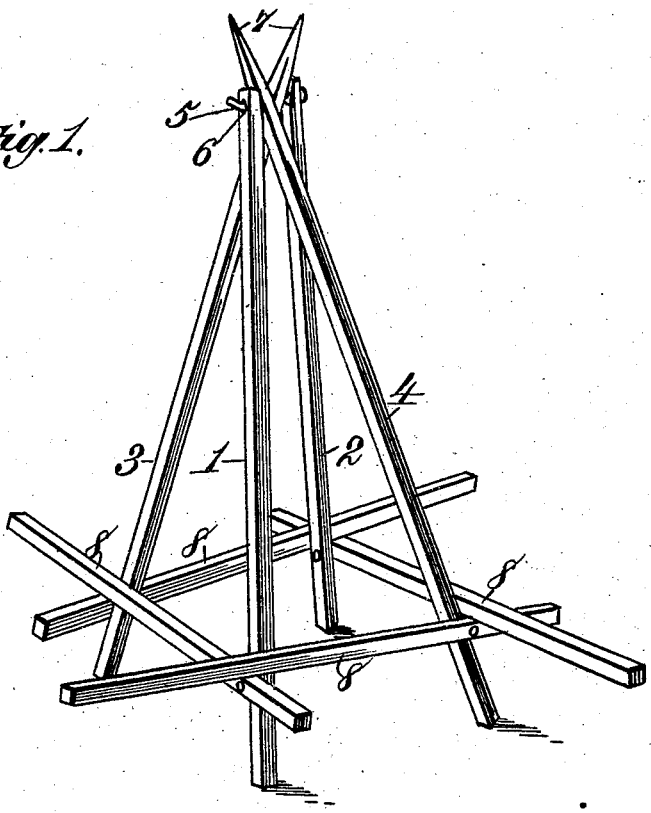
Figure 2:
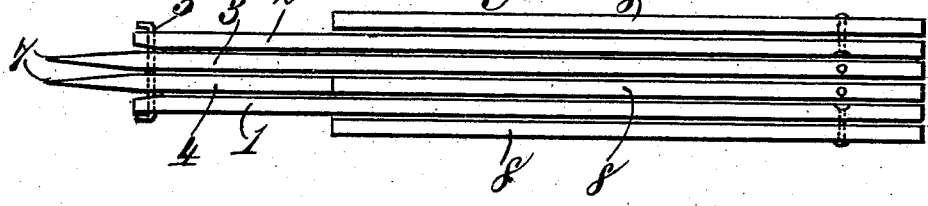
Figure 3:
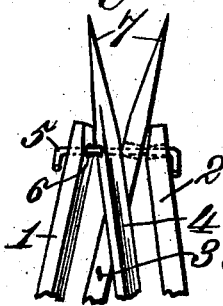

In the drawings, Figure 1 is a perspective view of a rack embodying the features of the invention and shown arranged for use. Fig. 2 is an elevation of the rack shown folded in compact form for storage. Fig. 3 is an enlarged detail view of the upper extremity of the rack, illustrating the connection of the parts thereof and the pointed formation of a portion of the members.

Similar numerals of reference are employed to indicate corresponding parts in the several views.

The improved rack comprises four uprights 1, 2, 3, and 4, which may be of any length, the uprights 1 and 2 being of equal length and the uprights 3 and 4 also of equal length, but longer than the uprights 1 and 2. The upper ends of all the uprights are assembled in such manner that a portion of the edges thereof is contiguous; and through the upper assembled ends of the uprights, as set forth, a pivot-rod 5 is inserted, openings 6 being formed in all the uprights and of such diameters as to provide a loose pivotal connection when engaged by the pivot-rod. The upper ends of the uprights 3 and 4 project above the similar ends of the uprights 1 and 2 and are reduced or formed with points 7, which when spread apart provide a forklike structure to receive and hold a quantity of hay to form a cap at the top of the rack.

Each upright at a distance above the lower end thereof has a supporting-bar 8, pivotally secured to the outer edge of same, the supporting-bar being attached nearer one end than the other, so that the longer portion thereof may project over and engage the adjacent shorter portion of the supporting-bar on the next upright in advance, all of the supporting-bars being similarly arranged or so that the longer extremity of one rests on the shorter extremity of the other, and a base structure or frame is thus provided at a distance from the ground-surface, with which the lower ends of the uprights 1, 2, 3, and 4 engage to hold the hay elevated and permit air to pass under and circulate within the inclosure formed by the rack and the hay disposed thereon.

In setting up the rack for use the uprights are spread apart and the supporting-bars are brought down to practically horizontal position and caused to engage each other, as shown by Fig. 1. The hay to be cured is then thrown up against and over the sides of the rack, which will then present a quadrangular pyramidal structure, and the application of the hay to the rack will be continued until said rack is thoroughly enveloped; but care will be taken to have the wall of hay not too thick in order to provide for a circulation of air therethrough both from the interior and the exterior. When the weight of the hay is equally disposed on the lower frame provided by the supports, the latter will remain immovable and hold the rack against accidental displacement and any tendency to accidental collapse.

When it is desired to reduce the rack for the purpose of storage, the supports on the several uprights are turned upwardly against the outer side edges of the latter, and the said uprights are then thrown inwardly, and in view of the fact that the side edges of the rack are arranged contiguous and connected at their upper extremities the uprights under such conditions will be folded in planes parallel with each other and present a flat arrangement without the least interference on the part of the supports, as clearly indicated by Fig. 2.

The improved rack is simple and cheap in its construction and will be found convenient in use.

A number of the racks may be employed in a field for curing hay, and when the latter is on the rack it will shed the greater part of the water during a wet season, owing to the pyramidal form of the stack produced by the use of the rack.

Having thus described the invention, what is claimed as new is—

1. A rack of the class specified, comprising a plurality of uprights pivotally connected to each other solely at their upper extremities and foldable into planes parallel with each other, and supports pivotally secured to the uprights above the lower ends thereof, each of the supports being connected to its upright nearer one end than the other and the opposite extremities of the supports projecting outwardly beyond the uprights, the several supports having their free ends in engagement or the one bearing on the other when arranged for use to provide a base-support for the rack.

2. A hay-curing rack comprising a plurality of uprights pivotally connected at their upper extremities and foldable into planes parallel with each other, and supports pivotally secured to the uprights above the lower extremities of the latter and disposable in approximately horizontal planes to form a lower frame, each support being connected to its upright nearer one end than the other and the several supports loosely bearing on the extremities of adjacent supports.

3. A hay-curing rack comprising a plurality of uprights pivotally connected at their upper extremities and foldable in planes parallel to each other, the inner pair of uprights being longer than the outer pair and having upper pointed extremities, and supports pivotally connected to the uprights above the lower ends of the latter, the extremity of one support being adapted to bear upon the extremity of the adjacent support to provide a lower approximately horizontal frame.

4. A hay-curing rack comprising a plurality of uprights having the edges of the upper extremities thereof arranged contiguous and loosely pivoted, a supporting-bar pivotally attached to the lower portion of each upright above the lower end of the latter, each supporting-bar being attached to its upright nearer one end than the other, the longer extremities of the supporting-bars being brought to bear on the shorter extremities of adjacent bars when the rack is opened and arranged for use.

In testimony whereof I have hereunto set my hand in presence of two subscribing witnesses.

HENRY E. BELL.

Witnesses:
 EDW. GRANSEADE,
 I. B. REDFORD.